UNITED STATES PATENT OFFICE.

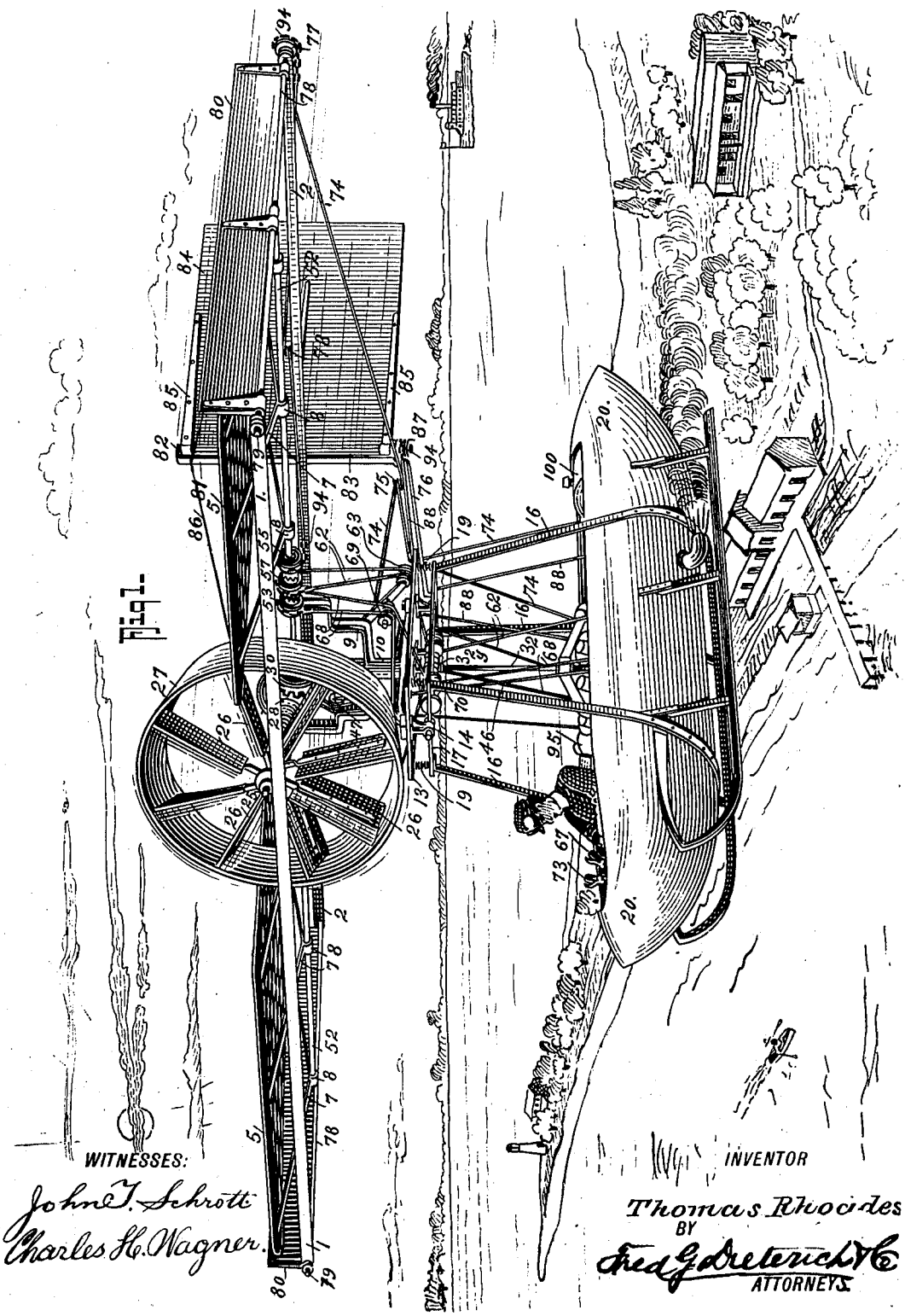

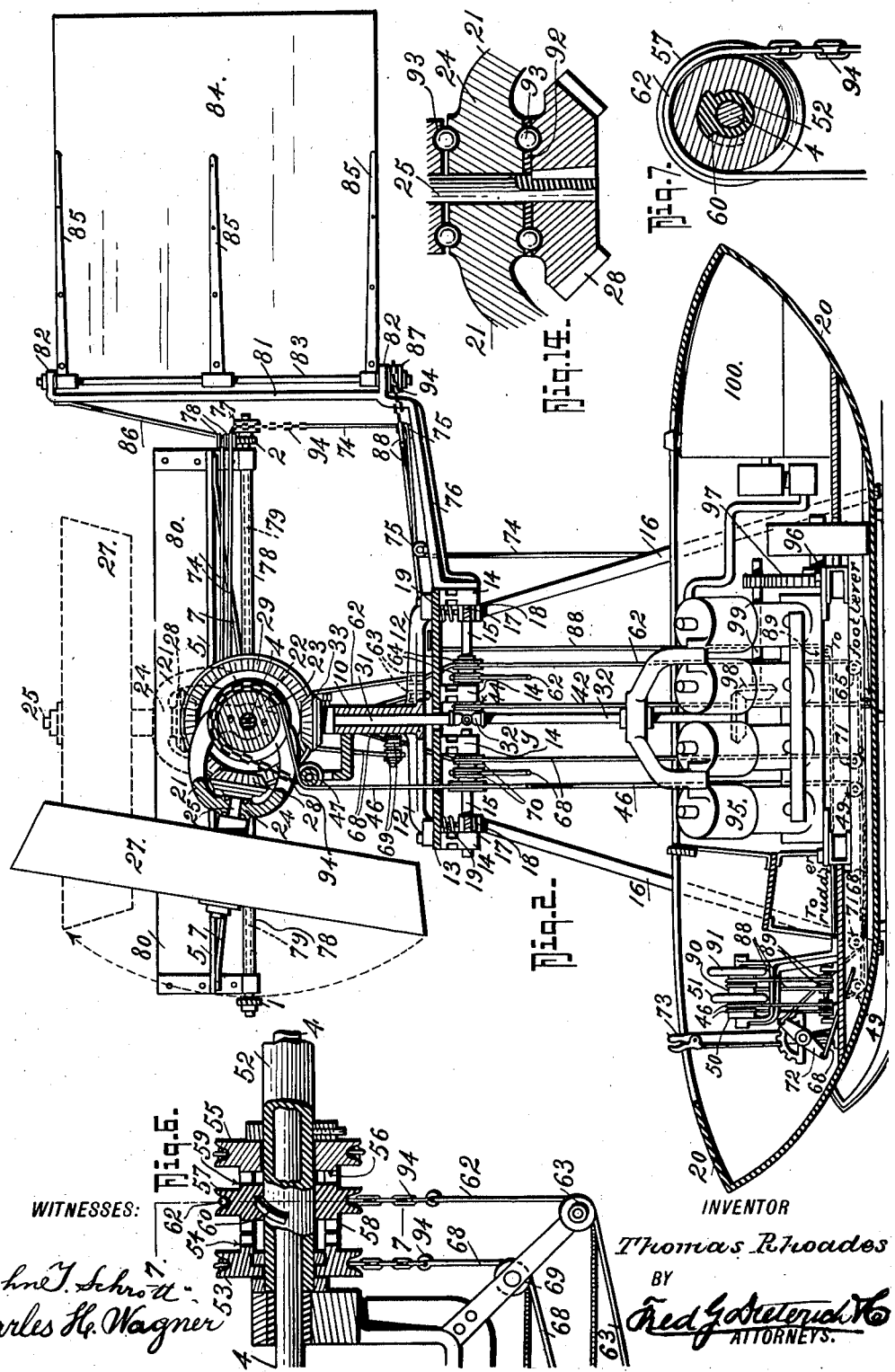

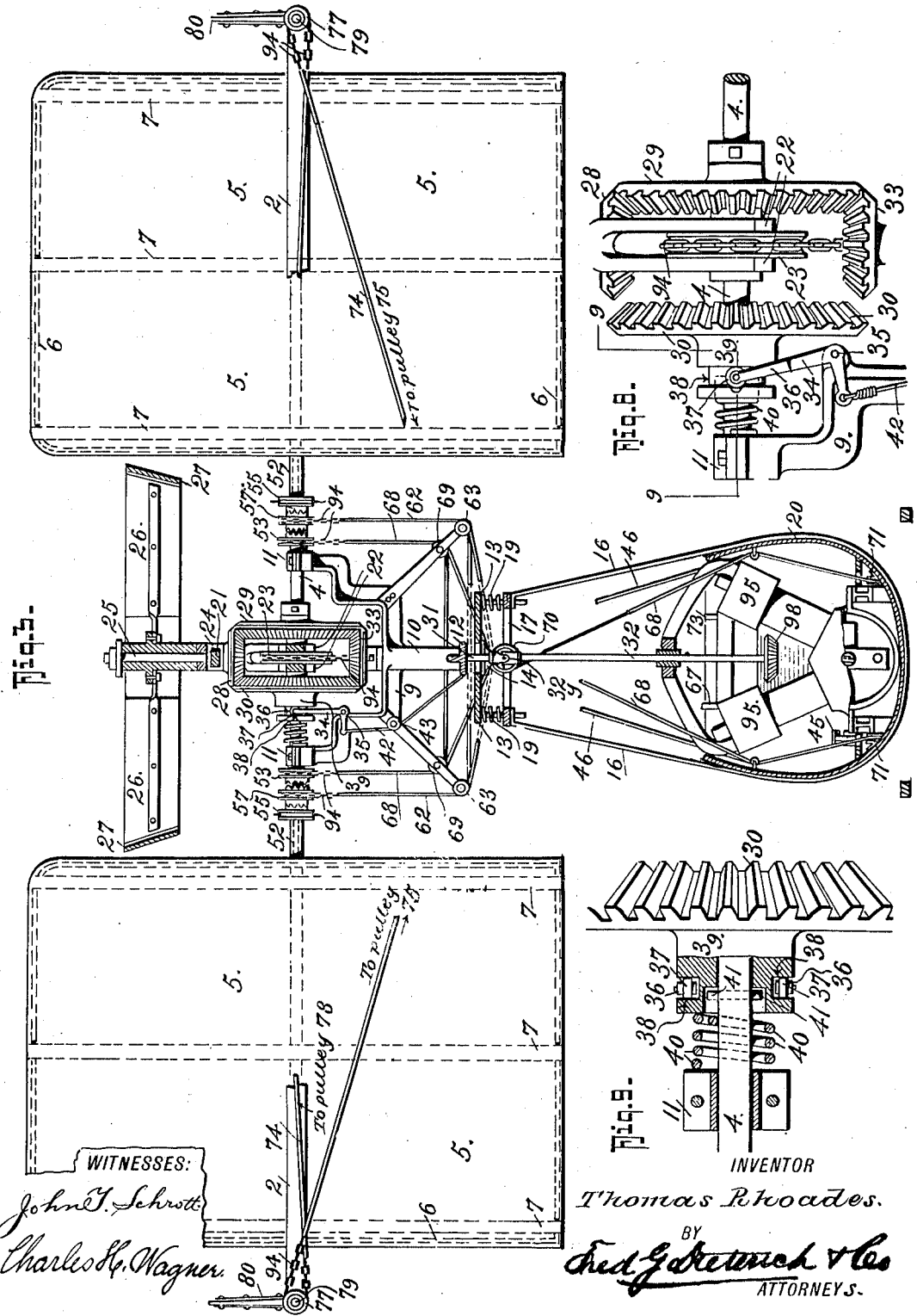

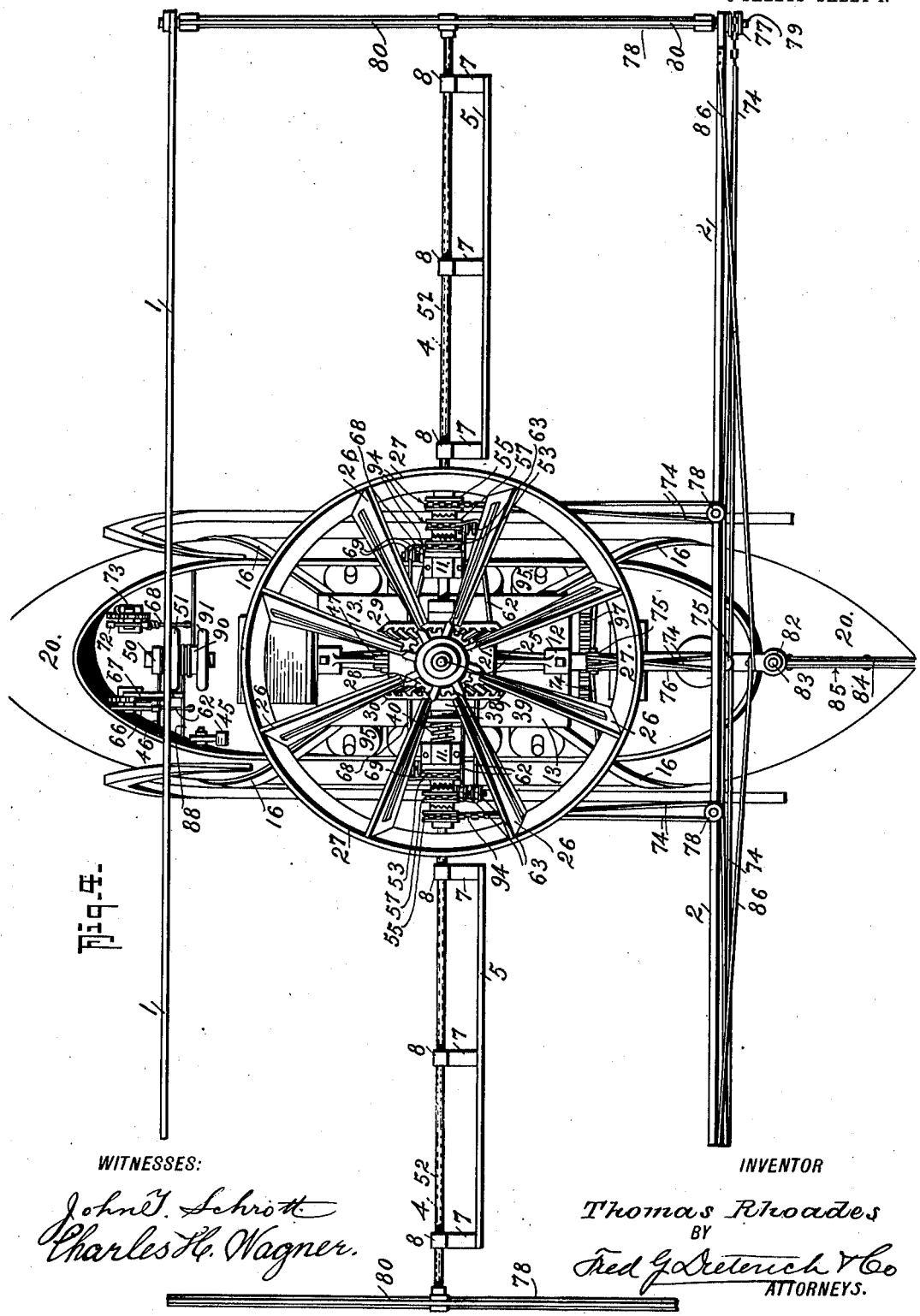

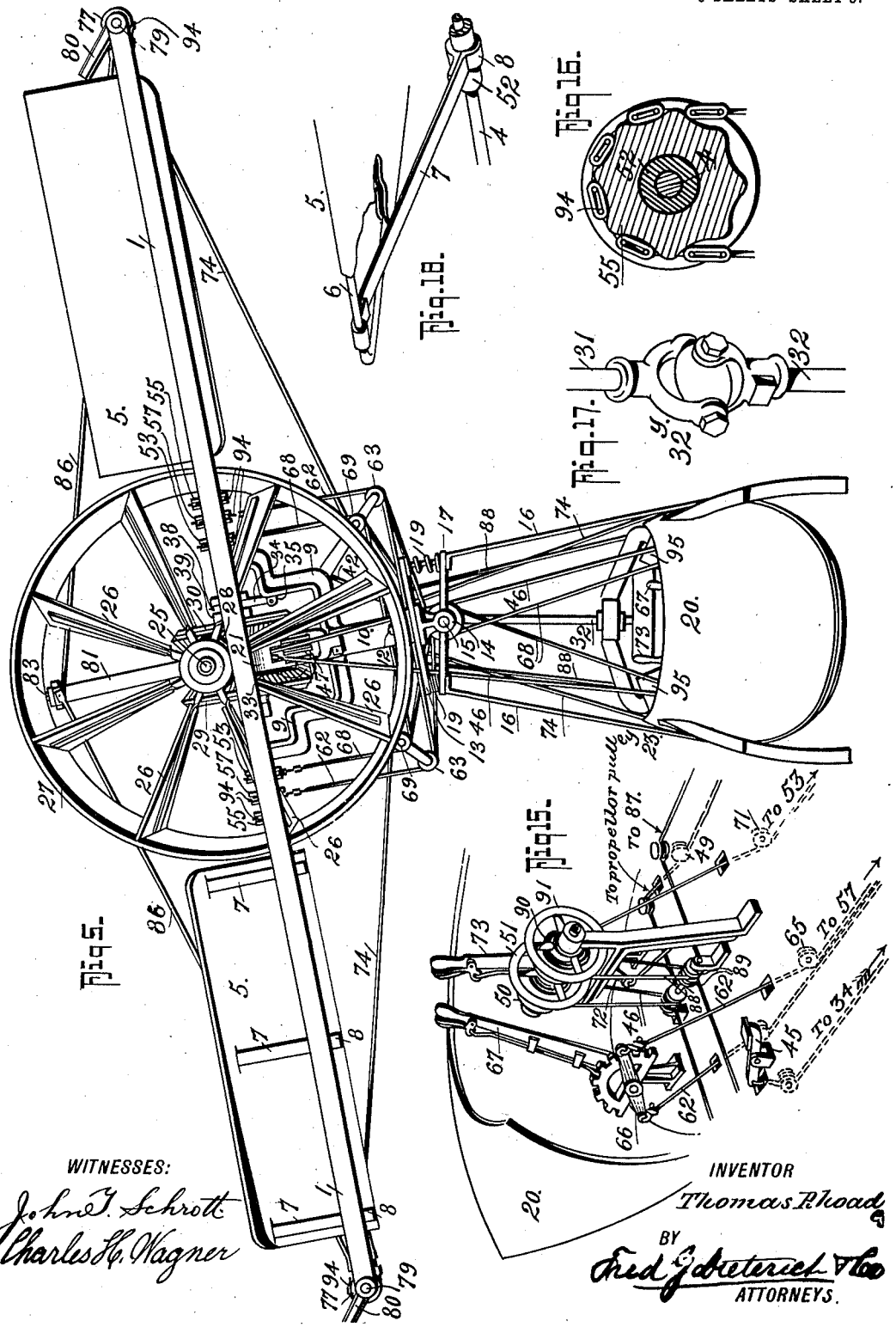

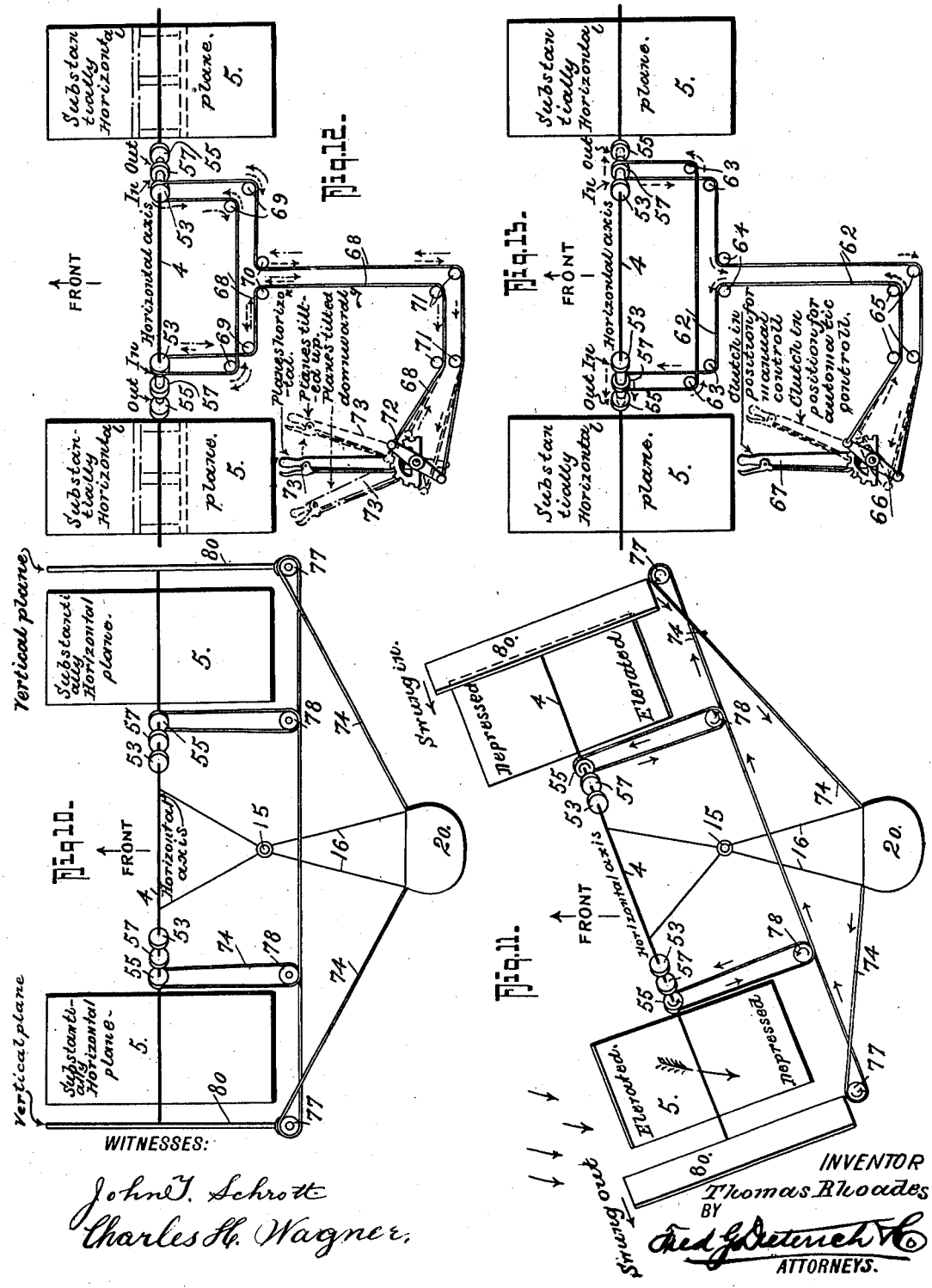

THOMAS RHOADES, OF HANNA, UTAH.

AIRSHIP.

993,108.  Specification of Letters Patent.  Patented May 23, 1911.

Application filed May 7, 1910. Serial No. 559,958.

*To all whom it may concern:*

Be it known that I, THOMAS RHOADES, residing at Hanna, in the county of Wasatch and State of Utah, have invented certain new and useful Improvements in Airships, of which the following is a specification.

In the art of aerial navigation, as practiced at the present time, there are essentially two distinctive types of "flying" machines, the one known as the "heavier than air" machines and the other known as the "lighter than air" machines. It is to this latter type that my invention relates. The machines of the latter type may be divided into two classes, the mono-planes and the bi-planes, so called from the number of supporting planes they carry. These machines of the "lighter than air" type all essentially consist of one or more supporting planes, by means of which the required resistance to the action of gravity is controlled, a direction rudder, an elevation rudder, a propeller and engine, and means for effecting transverse control. This latter means varies in the different kinds of machines, being either in the nature of auxiliary or stabilizing planes, as in the well-known Curtiss machines, flaps on the supporting planes, as in the well-known Farnum machines, or flexing or warping portions of the supporting planes, as in the well-known Wright machines. In all of these machines the elevating rudder and the transverse control devices are manually operated and require very skilled operators to run the machines.

Therefore, it is the prime object of my invention to provide a machine wherein the elevating rudder function, the supporting function and the stabilizing function are largely performed by one and the same means, and to provide means whereby the same may be operated (preferably in connection with auxiliary stabilizing planes), to automatically maintain the desired stability or equilibrium of the machine and to provide means whereby the combined supporting, elevating and stabilizing planes may be manually operated to cause the same to act purely as elevating rudders in ascending or descending with the machine. I also provide means whereby the propeller may be swung through an arc of approximately 180° so that it may be used to propel the machine vertically upward in ascending from the ground and whereby it may be then swung over to effect the required forward or backward propulsion of the machine.

Thus, it will be observed my improved aerial navigating machine in its general make-up consists essentially of sustaining planes, (which also assist in effecting the functions of elevating rudders and also act as stabilizing planes to assist in sustaining the machine in equilibrium), a direction rudder, a shiftable motor driven propeller (which not only effects movement of the machine horizontally but vertically as well, and acts also as the principal elevating medium) an automatic lateral control operating means, and manual means for operating the planes during ascent or descent of the machine.

From the foregoing it will be observed that another object of my invention is to provide a machine composed of as few parts as possible; that will be so simple in operation as to render the use of a highly skilled operator unnecessary.

I am aware that suggestions have heretofore been made that a pendulum be mounted on the machine from which operating cables are joined with the transverse controlling devices, in the attempt to effect an automatic action of the stabilizing means, but I have been unable to find any such devices in practical use at the present time.

In its more subordinate nature, the invention also includes those novel details of construction, combination and arrangement of parts, all of which will be first fully described and then be specifically pointed out in the appended claims, reference being had to the accompanying drawings, in which:

Figure 1, is a perspective view of my invention in use. Fig. 2, is a central vertical longitudinal section and part elevation of the same, the propeller being shown in full lines in the position to effect a forward movement of the machine and being shown in dotted lines in the position for raising the machine. Fig. 3, is a central vertical cross section showing the position of the propeller, and planes during ascent. Fig. 4, is a top plan view of the machine in ascent. Fig. 5, is a front elevation of the machine in flight tilted to one side and showing the relative position of the main planes and the position of the auxiliary or stabilizing planes when the machine is under automatic control to restore the machine to equilibrium. Fig. 6, is an enlarged detail view of one of the clutches for shifting the manual operating mechanism for elevating and depressing the planes, into position and cutting out the action of the automatic mechanism thereon. Fig. 7, is a cross section on the line 7—7 of Fig. 6, showing the shiftable controlling member running loose when the automatic or manual control is in operation. Fig. 8, is an enlarged detail view of the shiftable master propeller gear that locks the propeller in place, and showing the clutch releasing means. Fig. 9, is a detail section of a part of the mechanism shown in Fig. 8. Fig. 10, is a diagrammatic view showing the main and auxiliary planes under normal conditions. Fig. 11, is a view showing the same with the machine tilted to the left. Fig. 12, is a diagrammatic view showing the connections for the manual control for the main planes used in ascending and descending. Fig. 13, is a diagrammatic view of the clutch shifting lever and its connections with the shiftable clutch members. Fig. 14, is a detail view of a part of the propeller shaft thrust bearing. Fig. 15, is a detail perspective view of a part of the car and the controlled lever. Fig. 16, is a detail view of a slight modification of operating pulley or sheave. Fig. 17, is a detail view of the main transmission shaft knuckle joint. Fig. 18 is a detail perspective view of a part of the machine.

Referring now to the accompanying drawings in which like letters and numerals of reference indicate like parts in all of the figures, the main frame or "keel" of the machine consists of the front beams 1, the rear beams 2, the side rods or shafts 79 and the center or main supporting shaft or rod 4.

5—5 are the main planes, which in practice are constructed of canvas, silk, or other light sheeting held by a suitable light frame 6 which is longitudinally braced by braces 7 bent into an open V-shape in side elevation, and provided with bearings 8 at the apex of the V, by means of which the planes have pivotal movement on and are sustained by the shaft 4.

Pendently supported from the center rod or shaft 4 is a hanger frame 9 which has a central shaft bearing 10 and a pair of bifurcated arms terminating in bearings 11 which are securely clamped immovably on the shaft 4 in any approved manner, so that the bearing 10 will always be at right angles to the plane of the "keel" frame. At its lower end the frame 9 terminates in a longitudinal bar 12 to which the platform 13 is bolted. Beneath the platform 13 are hanger bearings 14—14 in which the short longitudinal rods or shafts 15—15 are held. It is on the rods 15—15 that the car 20 is suspended. The car 20 is carried by a pair of slings 16 secured to rocker arms 17—17 which have central bearings 18 to receive the rods 15 on which they have a relative rocking movement. Buffer spring devices 19 are interposed between the platform 13 and the arms 17 to act as shock absorbers and also to tend to maintain the arms 17 parallel to the platform 13.

The propeller shaft carrying frame 21 is a skeleton frame having bearings 22 for the rod or shaft 4 to pass through, the bearing part of the frame 21 being bifurcated to receive the central pulley 23 which is secured to the frame 21 to turn therewith. The frame 21 has a shaft bearing sleeve 24 for the propeller shaft 25 on which the propeller 26 and its housing 27 are mounted. The propeller shaft 25 has a pinion 28 that continuously meshes with a gear 29 mounted loosely on the shaft 4 and also normally meshes with a second gear 30 that is loose and also shiftable on the shaft 4.

The upper section 31 of the power transmission shaft 32 is held in the shaft bearing 10 of the pendent hanger frame 9 and it carries a pinion 33 that continuously meshes with the gear 29 and normally meshes with the gear 30, which gears 29—30 are in the nature of idler gears. The upper and lower transmission shaft sections 31—32 are joined by a universal knuckle joint $32^y$, as shown in Fig. 17 of the drawings.

The gear 30 is shiftable into and out of mesh with the pinions 28—33 by a bell crank lever 34 fulcrumed at 35 to the frame 9 and having a forked end 36 that is provided with anti-friction rollers 37 to ride in the groove 38 of the hub 39 of the gear 30. A coil spring 40 on the shaft 4 between the hub 39 and the bearing 11 adjacent thereto serves to maintain the gear 30 normally in mesh with pinions 28—33 and, in order to prevent undue pressure and consequent friction between the gear 30 and the pinions 28—33, a pin 41 on the shaft 4 serves as an abutment for the spring 40 when the gear 30 is in mesh with the pinions 28, 33 and thereby causes the spring to terminate its function at that time and act merely as a collar. The member 39 is counterbored to slip over the pin 41 when the gear 30 is moved out of mesh with the pinions 28—33. The bell crank lever 34 is operated to move the gear 30 out of mesh with the pinions 28—33, by a cord or cable 42 which passes over idlers 43—44 and down into the car 20 where it is connected with a foot operated lever 45 at a convenient location for the operator. (See Fig. 15).

The propeller 26 and its housing 27 may be swung through an arc of substantially 180° when the gear 30 is out of mesh with the pinions 28—33, by an endless cable 46 that passes around the sheave 23 and over idlers 47 on the frame 9, and idlers 49 on the car 20, and around the drum 50 of the propeller tilting wheel 51.

Each main plane 5 is joined with a sleeve 52 on the shaft 4, on which a pair of pulleys 53—55 run loosely. Each pulley 53—55 has an opposed clutch face 54—56 respectively with which the shiftable clutch pulley member 57 operates, the member 57 having a pair of clutch faces 58—59, one each for the respective clutch faces 54—56 of the pulleys 53—55, the pulley 57 being keyed to turn with the sleeve 52 by a spiral key 60 so that as the pulley 57 is turned one way or the other it may be drawn into engagement with either of the pulleys 53—55. A cable 62 passes over pulleys 57 and over idlers 63 on the frame 9 and thence over idlers 64 on the shafts 15 from which the cable passes down into the car 20, running over idlers 65 in the car and having its ends attached to the rocker arm 66 of the clutch shifting lever 67. The connection described is such that when the lever 67 is in the forward position shown in Fig. 13, the shifting clutches 57 will be in engagement with the respective pulleys 53 that form a part of the manual controlling devices for the planes 5 and when the lever 67 is in its rearward position (see diagrammatic figure) the shiftable clutches 57 will be in engagement with the respective pulleys 55 that form a part of the automatic controlling devices for the machine.

A cable 68 passes over the pulleys 53 then over idlers 69 on the frame 9, and over idlers 70 on the shafts 15, from which the cable 68 passes down into the car. After passing over idlers 71, the ends of the cable are joined to the rocker arm 72 of the manually controlled lever 73, by means of which the planes 5 are turned in unison on the shaft 4 to act as ascending and descending rudders.

A cable 74 has one end connected to the car body 20 and passes over idlers 75 on the bracket 76 of the frame 9. From thence it passes to a pulley 77 on the end of the sleeve 78 of the bearing 79 of the auxiliary stabilizing plane 80 on one side, say the right in Fig. 3 of the drawings. The cable then passes around such pulley 77 and from thence over an idler 78 to the pulley 55 for the right hand plane 5. From the pulley 55 for the right hand plane 5, the cable passes over another idler 78 and then passes over the pulley 55 for the other plane 5 from which it passes over another idler 78 to the pulley 77 on the end of the sleeve 78 of the auxiliary stabilizing plane 80 on the other side of the machine. From this sleeve 78 the cable 74 passes over another idler 75 on the bracket 76 down to and is joined with the car 20 again.

81 designates the rudder post frame portion of the bracket 75. The frame portion 81 is suitably stayed by braces 86 and it has bearings 82 in which the rudder post 83 is mounted. The rudder 84 is secured to the post 83 by straps 85 or in any other suitable manner. The post 83 is turned by a sheave or sprocket 87 around which the rudder cable 88 passes, the cable 88 running over idlers 89 to the drum 90 of the steering wheel 91 in the front of the car.

The shaft 25 is provided with anti-friction thrust bearing washers 92 having bearing-balls 93, as shown in Fig. 14 of the drawings.

Wherever any of the cables pass over working pulleys a short section of chain 94 is inserted to pass around such pulleys and insure a positive grip on the respective pulleys, and if found desirable the working pulleys may be formed with recesses for the links of the chain so as to act as sprocket wheels for the chain 94 (see Fig. 16).

Power is applied from a motor 95 on the car 20, and the shaft 96 of the motor 95 is geared up by gears 97—98 and a countershaft 99 with the main transmission shaft 32.

A suitable fuel tank 100 is provided on the car in which the fuel for the engine 95 is carried.

So far as described the manner in which my invention operates will be best explained as follows: Assume the machine to be located on the ground. The engine when running causes the shaft 32 to be turned, thereby transmitting the motion of the engine through the pinion 33 to the master gears 29 and 30 which transmit the motion to the pinion 28 of the propeller shaft 25 to set the propeller into operation. Should the propeller be in the full line position indicated in Fig. 2, for example, when the mechanism is on the ground, the operator moves the lever 67 to the position shown in full lines in Fig. 13 of the drawings, thereby shifting the clutch members 57 into engagement with the manual control pulleys 53, and disconnecting them from the pulleys 55. It should be understood at this point that when the clutch member 57 is in its clutching position, either in engagement with the pulley 53 or the pulley 55, the chain portion 94 that passes over the pulley 57 is out of the pulley, as shown in Fig. 7, so that the pulley 57 may be turned without movement of the cable 67. The operator having thrown the clutches 57 into the pulleys 53 to bring the manual controlling mechanism for the lateral control into action, moves the lever 73 to the dotted or rear position indicated in Fig. 12 to throw the planes 5 into a vertical plane, as shown in Fig. 3 of the drawings. The operator then presses the foot lever 45 to move the gear 30 out of mesh with the pinions 28—33 and then turns the wheel 51 until the propeller is in the position indicated in Fig. 3, to act vertically upward, after which the foot lever 45 is released to permit the spring 40 shifting the gear 30 back into mesh with the pinions 28—33 to lock the propeller shaft in alinement with the main transmission shaft 32 or in the position to which it has been moved. The engine is now started as before suggested, and the propeller 26 and planes 5 being in the position shown in Fig. 3, the machine will rise vertically upward. As the machine rises vertically upward with the "keel" frame horizontal, the auxiliary stability planes 80 will also be vertical, as shown in Fig. 3. The operator having arrived at the desired height first throws the lever 73 into the position shown in Fig. 2 and in the full line position indicated in Fig. 12, to bring the planes 5 into a horizontal or substantially horizontal position, after which, he again releases the gear 30 from the pinions 28—33 and turns the wheel 51 to tilt the propeller forward, as for example, into the position indicated in full lines in Fig. 2 of the drawings. After this the foot lever 45 is released and the spring 40 returns the gear 30 into mesh with the pinions 28—33, thus locking the propeller in position. The operator having brought the planes 5 into their horizontal position and moved the propeller into the position indicated in full lines in Fig. 2, to effect the forward propulsion of the machine, he now moves the lever 67 to the dotted line position indicated in Fig. 13, to move the clutch members 57 out of engagement with the pulleys 53 and into engagement with the pulleys 55 to cut out the manual controlling mechanism and cut in the automatic controlling mechanism. Having done this the machine will be maintained on an even "keel" wholly by the automatic action of the same. Assume the machine to be running under normal conditions, as diagrammatically indicated in Fig. 10, with the automatic mechanism connected up for operation, and assume the machine should tilt say, to the left, as shown in Fig. 11 of the drawings, this will cause movement to be effected in the cable 74, as indicated by the arrows in Fig. 11, thereby swinging the right hand auxiliary stabilizing plane 80 toward the center of the machine and simultaneously swinging the left hand auxiliary stabilizing plane 80 on the downgoing side outwardly, as indicated in Fig. 11, of the drawings, the front side of the plane 5 on the downgoing side of the machine being tilted upwardly and that on the upgoing side being tilted downwardly, thus increasing the angle of incidence between the air current and the plane on the downgoing side and decreasing the same with the plane on the upgoing side. This causes a greater air pressure to be exerted on the downgoing side of the machine with the consequent result that the machine will right itself and will resume its even "keel," it being understood that as the machine rights itself the planes 5 approximate a horizontal plane and the auxiliary planes 80 approximate vertical planes. Should the machine tilt toward the side opposite to that indicated in Fig. 11, the same general but opposite action takes place. In other words, should the machine tilt to the right, instead of to the left, as indicated in Fig. 11, the planes 80 will be swung to the right, instead of to the left, and the planes 5 turned in an opposite direction to that indicated in Fig. 11.

From the foregoing description of the construction and operation of the invention it is thought the same will be clear to those skilled in the art to which the invention appertains. I desire, however, to call attention to a few principal features of my invention.

It will be observed that when the manual control for the planes 5 is brought into operation the automatic control for the auxiliary stabilizing planes 80 is not affected. Thus should lateral oscillation of the machine take place during ascent while the planes 5 are under manual control the planes 80 will right the machine under automatic control. Furthermore, should the machine be traveling forwardly under normal conditions, the operator may throw out the automatic connection with the planes 5 and throw in the manual operating connection so as to tilt the planes 5 up or down, as conditions may require, that is, he may change the normal position of the planes 5 to present greater or less angles of incidence with the direction of flight and then throw the automatic controlling mechanism into connection with the planes 5 after they have been thus adjusted. Again, the propeller 25 may be used to effect an ascent not only vertically upward, but at any other angle with the horizontal, for example, the propeller 25 may be set at an angle say of 45° to the horizontal and the planes 5 set to correspond. Thus an ascent of the machine will take place along a line making approximately 45° to the horizontal. When, however, the machine makes an ascent from a confined locality where it is not advisable to move forward at the same time the ascent is being made the members may be positioned as indicated in Fig. 3 of the drawings, and the machine ascend directly upward.

It will be observed, that by using the gear 30 in addition to the gear 29, no additional means need be provided for holding the propeller shaft in its various positions, as the gear 30 turns in a direction opposite to that of the gear 29 and at the same speed. Hence no movement of the propeller shaft around the shaft 4 can take place while the gear 30 is in mesh with the pinions 28—33, it being understood that the pinion 33 is relatively stationary.

It will be observed that the casing 27 of the propeller is of frusto-conical form with the end of lesser diameter nearest the shaft 4. Thus the air stream as it enters the casing 27 will be condensed at the outgoing side of the casing 27 during the normal operation of the machine, and thus render the action of the propeller more efficient. It will also be observed that by reason of the gear 29 continuously meshing with the pinions 28—33 it is unnecessary to stop the movement of the propeller while shifting it from one position to another.

From the foregoing description taken in connection with the accompanying drawings, it is thought the complete construction, operation and advantages of the invention will be readily understood by those skilled in the art to which the invention appertains, and I desire it further understood that slight changes in the details of construction and arrangement of parts, and particularly in the proportioning of the various parts, may be made by those skilled in the art without departing from the spirit of the invention or the scope of the appended claims, as it will be obvious that in designing the practical machine due regard and consideration must be given for the various factors which enter into the mechanical construction of a machine of this type and which is wholly within the province of the skilled mechanic.

What I claim is:

1. In an aerial navigating machine, a horizontal transverse supporting frame, a car suspended beneath the same, main sustaining planes pivoted on a horizontal transverse axis carried by said frame, a propeller and a steering rudder carried by said frame, means for moving said planes to act as an ascending rudder and means to cause said planes to move relatively to assist in stabilizing the machine, and automatically actuated auxiliary stabilizing planes carried by said frame and pivoted on horizontal axes extending longitudinally of the frame.

2. In an aerial navigating machine, a horizontal transverse supporting frame, a car suspended beneath the same, main sustaining planes pivoted on a horizontal transverse axis carried by said frame, a propeller and a steering rudder carried by said frame, means for moving said planes to act as an ascending rudder and means to cause said planes to move relatively to assist in stabilizing the machine, automatically actuated auxiliary stabilizing planes carried by said frame and pivoted on horizontal axes extending longitudinally of the frame, and means for swinging said propeller to different positions to propel the machine upwardly or in a horizontal direction, or both.

3. In an aerial navigating machine, a horizontal transverse supporting frame, a pair of main sustaining planes pivoted on a horizontal transverse axis carried by said frame, automatically actuated devices for moving said main planes simultaneously and oppositely as said frame tilts laterally to change the angle of incidence between the line of flight and the planes to right the machine and automatically actuated auxiliary stabilizing planes carried by said frame and pivoted on horizontal axes extending longitudinally of said frame.

4. In an aerial navigating machine, a horizontal transverse supporting frame, a pair of main sustaining planes pivoted on a horizontal transverse axis carried by said frame, automatically actuated devices for moving said main planes simultaneously and oppositely as said frame tilts laterally to change the angle of incidence between the line of flight and the planes to right the machine, automatically actuated auxiliary stabilizing planes carried by said frame and pivoted on horizontal axes extending longitudinally of said frame, and manually actuated devices for moving said main planes together in the same direction to act as ascending and descending rudders.

5. In an aerial navigating machine, a horizontal transverse supporting frame, a pair of main sustaining planes pivoted on a horizontal transverse axis carried by said frame, automatically actuated devices for moving said main planes simultaneously and oppositely as said frame tilts laterally to change the angle of incidence between the line of flight and the planes to right the machine, automatically actuated auxiliary stabilizing planes carried by said frame and pivoted on horizontal axes extending longitudinally of said frame, manually actuated devices for moving said main planes together in the same direction to act as ascending and descending rudders, and manually actuated shifting devices for connecting and disconnecting said main planes from said plane moving devices.

6. In an aerial navigating machine, a horizontal transverse supporting frame, a pair of main sustaining planes pivoted on a horizontal transverse axis carried by said frame, automatically actuated devices for moving said main planes simultaneously and oppositely as said frame tilts laterally to change the angle of incidence between the line of flight and the planes to right the machine, automatically actuated auxiliary stabilizing planes carried by said frame and pivoted on horizontal axes extending longitudinally of said frame, manually actuated devices for moving said main planes together in the same direction to act as ascending and descending rudders, and manually actuated shifting devices for connecting and disconnecting said main planes from said plane moving devices without disturbing the operation of said auxiliary stabilizing planes.

7. In an aerial navigating machine, a horizontal transverse supporting frame, a car suspended beneath the same, main sustaining planes pivoted on a horizontal transverse axis carried by said frame, a propelling mechanism, auxiliary stabilizing planes pivoted on longitudinal axes carried by said frame, an automatic plane actuating device connected to said main planes and to said auxiliary planes for moving said main and auxiliary planes to act as stabilizing mediums, and means for operatively disconnecting said main planes from said automatically actuated devices without disturbing the connection between said automatically actuated devices and said auxiliary stabilizing planes.

8. In an aerial navigating machine, a horizontal transverse supporting frame, a car suspended beneath the same, main sustaining planes pivoted on a horizontal transverse axis carried by said frame, a propelling mechanism, auxiliary stabilizing planes pivoted at each side of said frame on a longitudinal axis carried by said frame, an automatic plane actuating device connected to said main planes and to said auxiliary planes for moving said main and auxiliary planes to act as stabilizing mediums, and manually operated devices for moving said main planes to act as an ascending and descending rudder, and a manually operated shifting mechanism for operatively connecting and disconnecting said main planes with either said manually operated main plane shifting devices or said automatically actuated main plane shifting devices without disturbing the operation of said auxiliary stabilizing planes under the influence of said automatic plane shifting devices.

9. In an aerial navigating machine, a horizontal transverse supporting frame, a car suspended beneath the same, a pair of main sustaining planes pivoted on a horizontal transverse axis carried by said frame, a propeller pivoted on said horizontal axis between said planes, means for swinging said propeller through an arc of substantially 180° in a vertical direction, a pulley on said horizontal transverse axis for each main plane, idler pulleys supported by said frame, an endless cable passing over said pulleys and connected with said car to form an automatic plane moving device, a second set of pulleys on said transverse axis, one for each plane and a manually controlled endless cable passing over said second set of pulleys to form a manual plane moving device, and a manually actuated clutch on said transverse axis for operatively connecting said plane with either of said plane moving devices.

10. In an aerial navigating machine, a horizontal transverse supporting frame, a horizontal transverse shaft carried by said frame, an auxiliary frame pendently suspended on said transverse shaft beneath said supporting frame, a car pivoted to said auxiliary frame on a longitudinal axis, a propeller shaft carrying frame pivoted on said horizontal transverse shaft to swing through an angle of substantially 180° in a vertical direction, means actuated from said car for swinging said propeller through said arc, a pair of main sustaining planes pivoted on said horizontal transverse shaft, one at each side of said propeller shaft carrying frame, a propeller carried by said propeller shaft carrying frame, a power plant in said car, transmission gearing connecting said power plant with said propeller to drive the same, a rudder carrying support mounted on said transverse supporting frame and said auxiliary frame, a lateral direction rudder carried by said rudder carrying frame, means controlled from said car for turning said rudder, and means controlled from said car for shifting said main sustaining planes simultaneously in the same direction to change the angle of incidence.

11. In an aerial navigating machine, a horizontal transverse supporting frame, a horizontal transverse shaft carried by said frame, an auxiliary frame pendently suspended on said transverse shaft beneath said supporting frame, a car pivoted to said auxiliary frame on a longitudinal axis, a propeller shaft carrying frame pivoted on said horizontal transverse shaft to swing through an angle of substantially 180° in a vertical direction, means actuated from said car for swinging said propeller through said arc, a pair of main sustaining planes pivoted on said horizontal transverse shaft, one at each side of said propeller shaft carrying frame, a propeller carried by said propeller shaft carrying frame, a power plant in said car, transmission gearing connecting said power plant with said propeller to drive the same, a rudder carrying support mounted on said transverse supporting frame and said auxiliary frame, a lateral direction rudder carried by said rudder carrying frame, means controlled from said car for turning said rudder, means controlled from said car for shifting said main sustaining planes simultaneously in the same direction to change the angle of incidence, and automatically actuated devices connected with and controlled by said car for shifting said main planes in opposite directions to act as stabilizing mediums.

12. In an aerial navigating machine, a horizontal transverse supporting frame, a horizontal transverse shaft carried by said frame, an auxiliary frame pendently suspended on said transverse shaft beneath said supporting frame, a car pivoted to said auxiliary frame on a longitudinal axis, a propeller shaft carrying frame pivoted on said horizontal transverse shaft to swing through an angle of 180° in a vertical direction, means actuated from said car for swinging said propeller through an arc, a pair of main sustaining planes pivoted on said horizontal transverse shaft, one at each side of said propeller shaft carrying frame, a propeller carried by said propeller shaft carrying frame, a power plant in said car, transmission gearing connecting said power plant with said propeller to drive the same, a rudder carrying support mounted on said transverse supporting frame and said auxiliary frame, a lateral direction rudder carried by said rudder carrying frame, means controlled from said car for turning said rudder, manually operated means controlled from said car for shifting said main sustaining planes simultaneously in the same direction to change the angle of incidence, and automatically actuated devices connected with and controlled by said car for shifting said main plane in opposite directions to act as stabilizing mediums, and manually operated devices controlled from said car for operatively connecting said planes with either of said plane moving devices and simultaneously disconnecting said planes from the other plane moving device.

13. In an aerial navigating machine, a horizontal transverse supporting frame, a horizontal transverse shaft carried by said frame, an auxiliary frame pendently suspended on said transverse shaft beneath said supporting frame, a car pivoted to said auxiliary frame on a longitudinal axis, a propeller shaft carrying frame pivoted on said horizontal transverse shaft to swing through an angle of 180° in a vertical direction, means actuated from said car for swinging said propeller through an arc, a pair of main sustaining planes pivoted on said horizontal transverse shaft, one at each side of said propeller shaft carrying frame, a propeller carried by said propeller shaft carrying frame, a power plant in said car, transmission gearing connecting said power plane with said propeller to drive the same, a rudder carrying support mounted on said transverse supporting frame and said auxiliary frame, a direction rudder carried by said rudder carrying frame, manually operated means controlled from said car for turning said rudder, means controlled from said car for shifting said main sustaining planes simultaneously in the same direction to change the angle of incidence, and automatically actuated devices connected with and controlled by said car for shifting said main planes in opposite directions to act as stabilizing mediums, manually operated devices controlled from said car for operatively connecting said planes with either of said plane moving devices and simultaneously disconnecting said planes from the other plane moving device, auxiliary stabilizing planes pivoted on longitudinal axes carried by said transverse supporting frame at its sides, and means connecting said auxiliary stabilizing planes with said automatic plane moving devices.

14. In an aerial navigating machine, a horizontal transverse supporting frame, a horizontal transverse shaft carried by said frame, a propeller carrying frame pivoted centrally on said shaft to swing in a vertical direction through an arc of substantially 180°, a main sustaining plane pivoted on said shaft at each side of said propeller, a pair of auxiliary stabilizing planes pivoted on longitudinal axes carried at the sides of said transverse supporting frame, a sleeve on said horizontal transverse shaft for each of said main planes to which said main planes are connected, a clutch pulley shiftably mounted on each of said sleeves to turn therewith; an automatic plane moving mechanism for moving said main planes to act as stabilizing planes, said mechanism including an idler pulley on each sleeve, a pulley connected to said auxiliary stabilizing planes, and a cable passing over said auxiliary plane-pulleys and said idler pulleys and a pendulous member to which said cable is connected; a manually actuated plane moving mechanism which includes a second idler pulley on each of said sleeves and a manually operated cable passing over each of said second idler pulleys; and means for shifting said shiftable clutch pulleys into engagement with either of said idler pulleys to operatively connect one of said plane moving devices with said main planes and simultaneously disconnect the other plane moving device from said main planes, substantially as shown and described.

15. In an aerial navigating machine of the heavier than air type, a horizontal transverse supporting frame, a car pivotally mounted on a longitudinal axis beneath said frame, a pair of main sustaining planes pivotally mounted on a horizontal transverse axis carried by said frame, automatic mechanism connecting said car with said planes for moving said planes on their pivots simultaneously in opposite directions as said supporting frame tilts to restore the machine to equilibrium, separate mechanism manually controlled from said car for moving said planes on their pivots simultaneously in the same direction to change the angle of incidence, and a shifting mechanism controlled from such car for bringing either of said plane moving mechanisms into operative connection with said planes, said shifting mechanism including shiftable clutch members mounted on said main plane axis, and an actuating device in said car and connected with said clutch members for operating the same.

16. In an aerial navigating machine of the heavier than air type, a horizontal transverse supporting frame, a car pivotally mounted on a longitudinal axis beneath said frame, a pair of main sustaining planes pivotally mounted on a horizontal transverse axis carried by said frame, automatic mechanism connecting said car with said planes for moving said planes on their pivots simultaneously in opposite directions as said supporting frame tilts to restore the machine to equilibrium, separate mechanism controlled from said car for moving said planes on their pivots together in the same direction to change the angle of incidence, a shifting mechanism controlled from said car for bringing either of said plane moving mechanisms into operative connection with said planes, auxiliary stabilizing planes pivotally mounted on longitudinal axes carried at the sides of said supporting frame, said auxiliary planes being normally held vertical, operative connections between said automatic plane moving mechanism and said auxiliary planes to cause said auxiliary planes to act as said automatic plane moving mechanism moves to assist in restoring the machine to equilibrium.

THOMAS RHOADES.

Witnesses:
FRED G. DIETERICH,
ALBERT E. DIETERICH.